UNITED STATES PATENT OFFICE 2,448,991

PRODUCTION OF N-ISOPROPYL-METHACRYLAMIDE

Joy G. Lichty, Cuyahoga Falls, Ohio, assignor to Wingfoot Corporation, Akron, Ohio, a corporation of Delaware No Drawing. Application November 27, 1944,
Serial No. 565,417

1 Claim. (Cl. 260—561)

This invention relates to unsaturated acrylamides having an isopropyl radical substituted on the nitrogen atom, and to methods of preparing the new compounds.

The new compounds are prepared by the reaction of acrylonitrile, or an alpha-substituted acrylonitrile, with isopropyl alcohol, and may be described generically by the following structural formula:

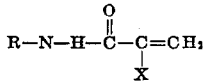

wherein R is an isopropyl group and X is a radical of the group consisting of alkyl, halogen and hydrogen.

The new compounds are prepared by the reaction of acrylonitrile, or an alpha substituted acrylonitrile, with an alkyl alcohol at an elevated temperature, preferably between 50 and 100° C. It is usually desirable to use an acid catalyst to induce a practicable rate of reaction. Suitable catalysts are sulphuric acid, phosphoric acid and p-toluene sulphonic acid, but other mineral and organic acids may be used. The reaction may be conducted at temperatures below the boiling point of the reagents; however, it is generally desirable to conduct the reaction at temperatures in excess of the boiling point of one or more of the reagents, thereby necessitating the use of pressures greater than atmospheric pressure. In the latter case, closed vessels, such as autoclaves, may be employed to confine the reaction. The products are then separated by distillation.

The chemical reaction involved may be represented by the following equation:

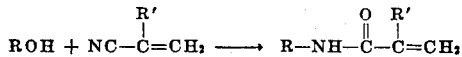

where R represents an isopropyl radical, and R' represents an alkyl radical, a halogen atom or a hydrogen atom.

The new compositions are active polymerizable materials and manifest their most important uses in the manufacture of resinous compositions. Although the self-polymer has substantial utility, the principal uses of the new compositions are in the form of copolymers with butadiene-1,3, or other diolefins, such as isoprene, dimethyl butadiene-1,3, chloroprene and other substituted conjugated butadienes. Compositions containing 20 to 80 percent of the N-alkyl acrylamides and 80 to 20 percent of butadiene-1,3 are tough rubbery compounds.

Further details of the preparation and use of the new compounds are set forth in the following detailed example:

Example

A 240 gram portion of isopropyl alcohol and 72 grams of water were added to 600 grams of concentrated sulphuric acid while cooling the mixture to avoid excessive increase in temperature. This was followed with the addition of 2 grams of bronze powder and one gram of hydroquinone. The mixture was agitated and maintained at a temperature of 80 to 110° C. during the addition of 268 grams of methacrylonitrile. The resulting mass was heated to 100 to 200° C. under a reflux condenser for a period of 1½ hours. At this stage, the reaction product was cooled slightly, and a solution consisting of 360 grams of isopropyl alcohol and 36 grams of water was added. The reaction product was then heated to about 90° C. on a steam bath for 25 hours. Five hundred cc. of water were added, and the upper layer was removed and dried.

A fraction boiling at 104–120° C./25 mm. contained 148 grams of a solid melting at 90–91° C. on recrystallizing from gasoline. Analysis for N-isopropyl methacrylamide:

Percent N found, 10.98, 10.95, 10.90. Calculated, 11.03. The identity of the compound was fixed by synthesizing the material from methacrylyl chloride and isopropyl amine and obtaining a mixed melting point of the two materials, which showed no depression. The reaction, therefore, is as follows:

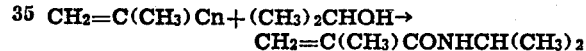

In general, it may be said that the reaction applies to those acrylonitrile-type compounds which may be substituted or not in the alpha carbon atom of the acrylo radical and in which the beta carbon atom is not substituted, the latter carrying only two hydrogen atoms in all instances.

The N-isopropyl methacrylamide was copolymerized with butadiene in an emulsion using 20 parts of sodium oleate, 0.133 part NaBO₃.4H₂O, and 0.48 part carbon tetrachloride. In one example 12 parts of butadiene-1,3 were used with 4 parts of the acrylamide. In another example 9.6 parts of butadiene-1,3 were used with 6.4 parts of the methacrylamide. The copolymers obtained were rubber-like.

This application is a continuation-in-part of application Serial No. 314,634, filed January 19, 1940 (now issued as U. S. Patent 2,320,089) and of application Serial No. 451,945, filed July 22, 1942, which is abandoned.

Although this invention has been described with respect to a specific example, it is not intended that the details thereof shall be construed as limitations upon the scope of the invention except as incorporated in the following claim.

I claim:

A method of preparing N-isopropyl-methacrylamide which comprises mixing isopropyl alcohol with methacrylonitrile at an elevated temperature in the presence of an acid catalyst.

JOY G. LICHTY.

REFERENCES CITED

The following references are of record in the file of this patent:

UNITED STATES PATENTS

| Number | Name | Date |
|---|---|---|
| 1,851,040 | Fikentscher | Mar. 29, 1932 |
| 2,288,197 | Kranzlein | June 30, 1942 |
| 2,311,548 | Jacobson | Feb. 16, 1943 |
| 2,320,089 | Lichty | May 25, 1943 |

FOREIGN PATENTS

| Number | Country | Date |
|---|---|---|
| 514,912 | Great Britain | Nov. 21, 1934 |
| 715,893 | France | Dec. 10, 1931 |
| 715,961 | France | Dec. 12, 1931 |

OTHER REFERENCES

Sidwicks, "Organic Chemistry of Nitrogen" (1937), pages 139, 140, 310 and 312.

Kreible et al., "Jour. Am. Chem. Soc.," vol. 61 (1939), pages 560 to 563.